United States Patent
Estrada

(10) Patent No.: US 7,574,335 B1
(45) Date of Patent: Aug. 11, 2009

(54) MODELLING PIECE-WISE CONTINUOUS TRANSFER FUNCTIONS FOR DIGITAL IMAGE PROCESSING

(75) Inventor: James J. Estrada, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 698 days.

(21) Appl. No.: 10/777,566

(22) Filed: Feb. 11, 2004

(51) Int. Cl.
| G06F 7/60 | (2006.01) |
| G06F 17/10 | (2006.01) |
| G06F 17/00 | (2006.01) |
| G06F 17/11 | (2006.01) |
| G06F 17/15 | (2006.01) |
| G06F 17/17 | (2006.01) |
| G03F 3/08 | (2006.01) |
| G03F 3/00 | (2006.01) |
| G06F 11/00 | (2006.01) |
| G06E 1/04 | (2006.01) |
| G06E 1/00 | (2006.01) |

(52) U.S. Cl. .......................... 703/2; 708/530; 708/533; 708/540; 358/518; 358/519; 382/167

(58) Field of Classification Search .............. 348/229.1; 708/512, 530, 533, 540; 703/6, 2; 382/167; 358/1.9, 520, 518–519; 345/589–591, 600, 345/603–604

See application file for complete search history.

(56) References Cited

U.S. PATENT DOCUMENTS

| 4,969,045 A | * | 11/1990 | Haruki et al. ............. 348/229.1 |
| 5,087,966 A | | 2/1992 | Harradine |
| 5,132,796 A | | 7/1992 | Topper et al. |
| 5,255,093 A | | 10/1993 | Topper et al. |
| 5,381,349 A | * | 1/1995 | Winter et al. ............... 382/167 |
| 5,398,076 A | * | 3/1995 | Lum et al. ................... 348/676 |
| 5,694,484 A | | 12/1997 | Cottrell et al. |
| 5,710,871 A | | 1/1998 | Tadenuma et al. |
| 5,790,707 A | | 8/1998 | Tanaka et al. |
| 6,076,964 A | * | 6/2000 | Wu et al. ..................... 374/141 |
| 6,157,735 A | * | 12/2000 | Holub ......................... 382/167 |
| 6,535,255 B2 | * | 3/2003 | Motonakano et al. ....... 348/675 |
| 6,771,839 B2 | * | 8/2004 | Westerman ................. 382/274 |
| 6,944,304 B1 | * | 9/2005 | Dance et al. ............... 381/94.7 |
| 7,076,119 B2 | * | 7/2006 | Takemoto ................... 382/312 |
| 2002/0005911 A1 | * | 1/2002 | Motonakano et al. ....... 348/675 |
| 2002/0067435 A1 | | 6/2002 | Rapaich |

(Continued)

OTHER PUBLICATIONS

Hany Farid, Blind Inverse Gamma Correction, Oct. 2001, IEEE Transactions on Image Processing, vol. 10, No. 10.*

(Continued)

*Primary Examiner*—Hugh Jones
*Assistant Examiner*—Suzanne Lo
(74) *Attorney, Agent, or Firm*—Fish & Richardson P.C.

(57) ABSTRACT

Methods and apparatus, including computer program products, for modelling a non-linear transfer function with a power law function. A transfer function is received. Iteratively, until a termination flag is set, a first power law function is received, an auxiliary function is generated from the transfer function and local differences between the transfer function and the first power law function, a second power law function is fitted to the auxiliary function, a modelling error is calculated from the second power law function and the transfer function, and the termination flag is set when the modelling error is less than a predetermined value.

47 Claims, 5 Drawing Sheets

U.S. PATENT DOCUMENTS

2003/0021473 A1* 1/2003 Chiu .................... 382/167
2004/0267854 A1* 12/2004 Haider et al. ............ 708/512
2005/0088534 A1* 4/2005 Shen et al. ............ 348/218.1

OTHER PUBLICATIONS

Dahlquist, Germund et al.; *Numerical Methods*, pp. 197-198, 201-206, 1974, Prentice-Hall, Inc., Englewood Cliffs, NJ.

Björck, Ake; *Numerical Methods For Least Squares Problems*, pp. 42-44, 1996, Society for Industrial and Applied Mathematics, Philadelphia.

Moré, Jorge J.; *The Levenberg-Marquardt Algorithm: Implementation and Theory*, pp. 105-116, 1978, Proceedings of the Biennial Conference on Numerical Analysis.

Brown, Kenneth M, Dennis, Jr., J.E., "Derivative Free Analogues of the Levenberg-Marquardt and Gauss Algorithms for Nonlinear Least Squares Approximation", pp. 289-297, 1972, *Numer. Math 18*, Springer-Verlag.

Marquardt, Donald W.; "An Algorithm For Least-Squares Estimation of Nonlinear Parameters", pp. 431-441, Jun. 1963, *J. Soc. Indus. Appl. Math, vol. 11, No. 2*.

\* cited by examiner

MODELLING PIECE-WISE CONTINUOUS TRANSFER FUNCTIONS FOR DIGITAL IMAGE PROCESSING

BACKGROUND

The present invention relates to processing digital images.

A digital image includes digital data describing local graphical attributes of the image, such as color or gray level of pixels in the image. Digital images can be generated by input devices, such as scanners or digital cameras. Digital images can also be generated or processed by software applications executed in a computer system. The digital image can be visually presented to users by output devices. The output device can be a display device using a cathode ray tube ("CRT"), a liquid crystal display ("LCD") or a video projector. Or the display device can be a printing device, such as a laser printer or an ink jet printer.

Typically, each input or output device represents graphical attributes of the image in a device specific electronic representation. For example, CRT and LCD display devices display each pixel of the image using three display elements that display red, green, and blue colors separately. The corresponding device specific color representation includes a red, a green and a blue ("RGB") color component for each image pixel. Printers can display each pixel of the image using cyan, magenta, yellow, and black inks that represent the color components in a cyan-magenta-yellow-black ("CMYK") color space.

Input and output devices are typically characterized by device specific opto-electronic transfer functions. An opto-electronic transfer function is a function that describes the relationship between the electronic representation of a color and the corresponding optical (or perceptual) intensities of the color as they are produced by the device. The transfer function is typically defined for the device specific representation of colors, and is applied separately to each component of the device specific color space. For a scanner, the opto-electronic transfer function describes how colors in an original image relate to scanned color values. For a CRT monitor, the opto-electronic transfer function describes how displayed red, green and blue color intensities depend on the color values in the electronic representation of the color. Typically, the optoelectronic function is a piece-wise continuous function that includes a substantially linear portion at small intensities and a shifted power law portion at larger intensities.

A digital image is often transmitted from one device to another. For example, an image generated by a digital camera can be transmitted to a computer display or a printer. Or digital images can be transmitted between computers connected to a computer network such as the Internet. When displayed or printed on different devices, the same digital image may look different due to differences in the specific color spaces or transfer functions of the different devices. To avoid such variations, the image is associated with an image profile, such as an International Color Consortium ("ICC") profile. The image profile identifies one or more input transfer functions that map a device specific representation of the image into a device independent representation. The device independent representation can specify the colors of the image in a device independent color space, such as the profile connection space ("PCS") defined by the ICC or the L*a*b* color space defined by the Commission Internationale de l'Éclairage ("CIE").

An image profile typically specifies a transfer function for the colors of an image as a look-up table. The look-up table associates a finite set of input color values with corresponding transfer function values. For input values outside the finite set, transfer function values can be obtained by interpolating between two or more values stored in the look-up table. Alternatively, transfer function values can be obtained from a function that is fit to the finite set of values stored in the look-up table. The fitted function is typically a simple power law function that is fit to the look-up table values using standard techniques, such as the method of Levenberg and Marquardt for fitting non-linear data.

One of the most important transfer functions stored in an image profile is the transfer function for gamma corrections. This transfer function is used to compensate for the non-linear voltage response curve of output display devices. To faithfully display or print an image on a particular output device, the color values of the image are precompensated for the non-linear distortions that will be caused by the output transfer function of the device. That is, the color values of the image are adjusted such that when the image is displayed on the output device, the transfer function of the output device will distort the adjusted color values such that the "true" colors in the image will be reproduced.

SUMMARY

A piecewise-continuous transfer function is modelled by fitting an auxiliary function that is generated from the transfer function itself and from the errors of modelling the transfer function with a previous function. For example, a piece-wise continuous monotonically increasing transfer function can be modelled with a simple power law function.

In general, in one aspect, the invention provides methods and apparatus, including computer program products, for modelling a non-linear transfer function with a power law function. A transfer function is received. Iteratively, until a termination flag is set, a first power law function is received, an auxiliary function is generated from the transfer function and local differences between the transfer function and the first power law function, a second power law function is fitted to the auxiliary function, a modelling error is calculated from the second power law function and the transfer function, and the termination flag is set when the modelling error is less than a predetermined value.

Particular implementations can include one or more of the following features. Receiving the first power law function in a given iteration can include receiving the second power law function that was generated in the preceding iteration. Receiving the first power law function in the first iteration can include receiving a power law function that is generated by fitting the transfer function. The number of iterations can be counted and the termination flag can be set when the number of iterations exceeds a maximum number of iterations. The transfer function can be a transfer function for gamma correction. The first and second power law functions can be power law functions having a form of $c\, x^\beta$, where x is the input variable of the power law functions, and c and β are real numbers. Fitting the second power law function to the auxiliary function can include fitting a linear function to a logarithmic representation of the auxiliary function. Fitting the linear function to the logarithmic representation of the auxiliary function can include minimizing a least square error between the linear function and the logarithmic representation of the auxiliary function.

A modifying parameter can be used to weight the local differences between the transfer function and the first power law function that are used to generate the auxiliary function. The modifying parameter can be optimized. Optimizing the modifying parameter can include generating multiple auxiliary functions, where each auxiliary function is generated by weighting the local differences between the transfer function and the first power law function using a corresponding modifying parameter. Each of the auxiliary functions can be fitted to generate a plurality of second power law functions. A modelling error can be calculated for each power law function in the plurality of second power law functions to generate a plurality of modelling errors. An optimal modifying parameter can be determined from the plurality of modelling errors. Determining the optimal modifying parameter can include determining a range of modifying parameters that includes the optimal modifying parameter. Determining the optimal modifying parameter can include performing a golden search for the modelling error that corresponds to the optimal modifying parameter.

Calculating the modelling error for the second power law function can include calculating a total square error or the maximum absolute difference between the transfer function and the second power law function. Receiving a transfer function can include receiving a plurality of transfer function values. Receiving a transfer function can include receiving a piecewise continuous monotonically increasing transfer function.

In general, in another aspect, the invention provides methods and apparatus, including computer program products, for modelling a non-linear transfer function with a power law function. A transfer function is received and the transfer function is fitted with an approximating power law function. Iteratively, until a termination flag is set, the approximating power law function is reflected about the transfer function to generate an auxiliary function, the auxiliary function is fitted with a new approximating power law function, a modelling error is calculated from the new approximating power law function and the transfer function, and the termination flag is set when the modelling error is less than a predetermined value.

The invention can be implemented to realize one or more of the following advantages. A piece-wise continuous monotonically increasing transfer function can be modelled with a simple power law function with high speed and accuracy. The power law function can be generated using simple linear data fitting algorithms, such as algorithms based on linear least square techniques. The transfer function can be modelled with high accuracy without using complicated non-linear mathematical data fitting algorithms, such as algorithms based on the Levenberg and Marquardt techniques. The transfer function can be modelled without using special seed values for the linear data fitting algorithm. The power law function modelling the transfer function can be used to quickly and efficiently obtain transfer function values for any input data values, regardless of whether they are provided in the transfer function look-up table. The transfer function can be represented as a simple power law with a single gamma exponent. Different transfer functions, each modelled with its own simple power law function, can be easily combined or inverted to obtain net transfer functions.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
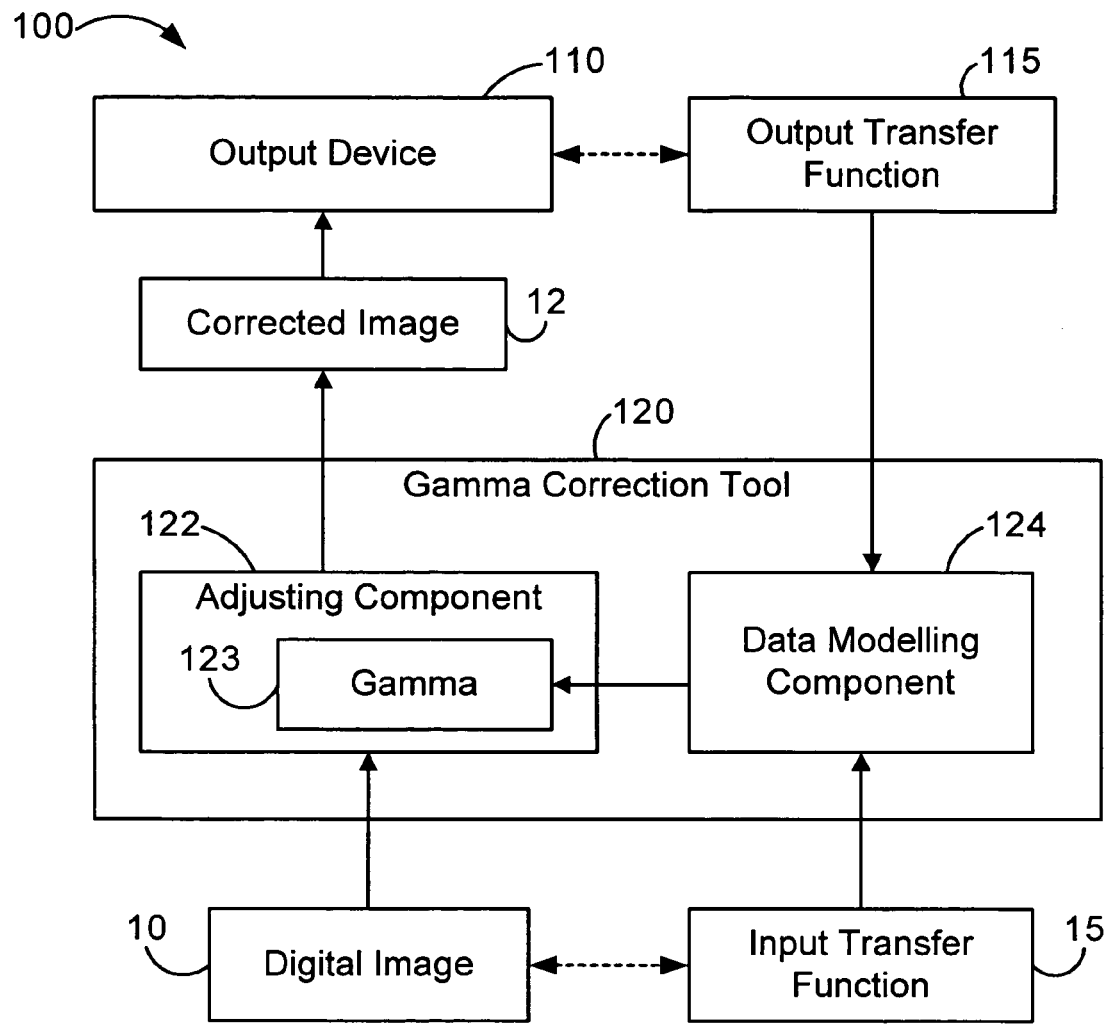
FIGS. 1A and 1B are schematic block diagrams illustrating a system for gamma correction.

FIG. 1A illustrates a system 100 for performing gamma correction of a digital image 10. The system 100 includes an output device 110 for displaying electronic images and a gamma correction tool 120 for performing gamma corrections for the output device 110. The gamma correction tool 120 receives and processes the digital image 10 to generate a corrected image 12 that is transmitted to the output device 110. The output device 110 displays or prints the corrected image 12. The output device 110 can be a display device, such as a CRT device, an LCD display or a video projector. Alternatively, the output device can be a printing device, such as a laser printer or an ink jet printer. The gamma correction tool 120 can be implemented in a software application or as a plug-in to software applications that are operable to process digital images. Alternatively, the gamma correction tool 120 or any portion of it can be implemented in the hardware of an input or output device.

The digital image 10 includes one or more graphics objects that specify local graphical attributes, such as colors of pixels in the image 10, according to a device specific representation. For example, colors in the image can be defined in a device specific RGB or CMYK color space. The digital image 10 is typically associated with an input transfer function 15 that specifies a non-linear relation between the device specific representation of one or more local attributes in the image 10 and a device independent representation for the one or more local attributes. In one implementation, the input transfer function 15 maps color components of the device specific color space to a device independent color space, such as the PCS or L*a*b* color space. The input transfer function can also specify a non-linear relation between two device dependent representations of the digital image 10. In alternative implementations, the input transfer function 15 can be defined to map luminance or other local attributes of the image.

The input transfer function 15 corresponds to the opto-electronic transfer function of the device that has been used to generate the digital image 10. If the digital image 10 is generated by an input device such as a scanner, the input transfer function 15 specifies the relationship between colors as represented by the input device and by the device independent color space. If the digital image 10 is generated by a software application for image processing, the input transfer function 15 represents the opto-electronic transfer function of a display device that has been used to display the digital image 10 during the image processing.

The input transfer function 15 can be specified in an image profile such as an ICC profile that is attached to a digital document including the digital image 10. Alternatively, the input transfer function 15 can be specified in one or more separate documents associated with the digital image 10. For example, the input transfer function 15 can be specified in documents describing the input or output device that has been used to generate or process the digital image 10, and metadata in the digital image 10 can identify the input or output devices. Alternatively, the input transfer function 15 can be associated with the digital image 10 through user input.

The output device 110 is associated with an output transfer function 115. The output transfer function specifies the non-linear relationship between the color representation used by the output device 110 and a device independent color representation (or another device-dependent color representation). For example, the output transfer function 115 can specify an opto-electronic transfer function for the red, green and blue colors of the output device 110. If the output device 110 has a built-in (software or hardware) gamma correction that is optimized to a particular color representation of images received by the output device, the output transfer function 115 specifies a non-linear transformation to the particular representation. In alternative implementations, the output transfer function 115 can be specified for luminance or other graphical attributes of the image. The output transfer function 115 can be specified in an output profile, such as an ICC profile associated with the output device. Alternatively, the output profile can be defined or modified through user input. An exemplary opto-electronic transfer function is discussed below in reference to FIG. 5.

The gamma correction tool 120 includes an adjusting component 122 and a data modelling component 124. The adjusting component 122 adjusts the color information specified by image pixels. The adjustment is based on a gamma value 123 that is calculated by the data modelling component 124.

The adjusting component 122 uses a power law function ("p(x)") to map the color values specified by pixels in the digital image 10 to corrected color values in the corrected image 12. The power law function is characterized by an exponent that depends on the gamma value 123. In one implementation, the power law function p(x) is defined for each input value ("x") by an exponent ("β") that is the inverse of the gamma value 123 such that $$p(x)=cx^\beta,$$

where $\beta=1/\gamma$ and c is a normalization constant depending on the allowed range of input and corrected values. With the power law function p(x), a gamma correction can be performed for all of the colors in the image without interpolating between different transfer function values in a look-up table.

In alternative implementations, the adjusting component 122 can use the power law function p(x) to adjust luminance or other local attributes of the image. In addition to the power law function p(x), the adjusting component 122 can also use a look-up table to adjust local attributes of the image. For example, the adjusting component 122 can use a look-up table for one color component in a color space (e.g., black in CMYK color space) and a power law function for the other color components (i.e., cyan, magenta and yellow). Or the adjusting component 122 can use the power law function if a color component has a value within a predetermined range, and a look-up table otherwise.

To determine the gamma exponent 123, the data modelling component 124 receives and models the input transfer function 15, the output transfer function 115, or both with a power law function. Alternatively, the data modelling component 124 can model the inverse of the input transfer function or the output transfer function. Optionally, the data modelling component 124 can combine the input transfer function 15 and the output transfer function 115 to calculate a net transfer function. Alternatively, the data modelling component 124 can separately model the input and output transfer functions with power law functions, and combine the power law functions that model the input and output transfer functions in a later step.

Figure 1B:
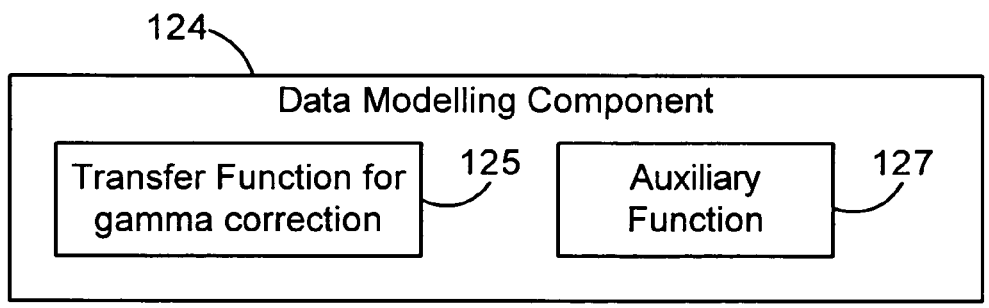

FIG. 1B illustrates an implementation of the data modelling component 124 that models a transfer function 125 for gamma correction with a model function, such as a power law function. The transfer function 125 can be the input transfer function 15, the output transfer function 115, a net transfer function or the inverse of any of these functions. In alternative implementations, the transfer function 125 can be any other piece-wise continuous function that is reasonably modelled with a power law function.

To model the transfer function 125, the data modelling component 124 generates and fits an auxiliary function 127 with a power law function. The exponent of the power law function that is fit to the auxiliary function 127 is used to determine the gamma exponent 123. In one implementation, the auxiliary function 127 is generated by modifying the transfer function 125 using the errors obtained from previously modelling the transfer function 125 with a particular power law function. The particular power law function can be obtained by fitting the transfer function 125 using a simple data fitting algorithm. In this implementation, no particular or predetermined seeding is required to generate or fit the auxiliary function 127. Alternatively, the particular power law function can be a predetermined function. Methods for generating the auxiliary function 127 are discussed more fully below in reference to FIGS. 2 and 3. The data modelling component 124 determines the gamma value 123 from the exponent of the power law function used to model the transfer function 125.

Figure 2:
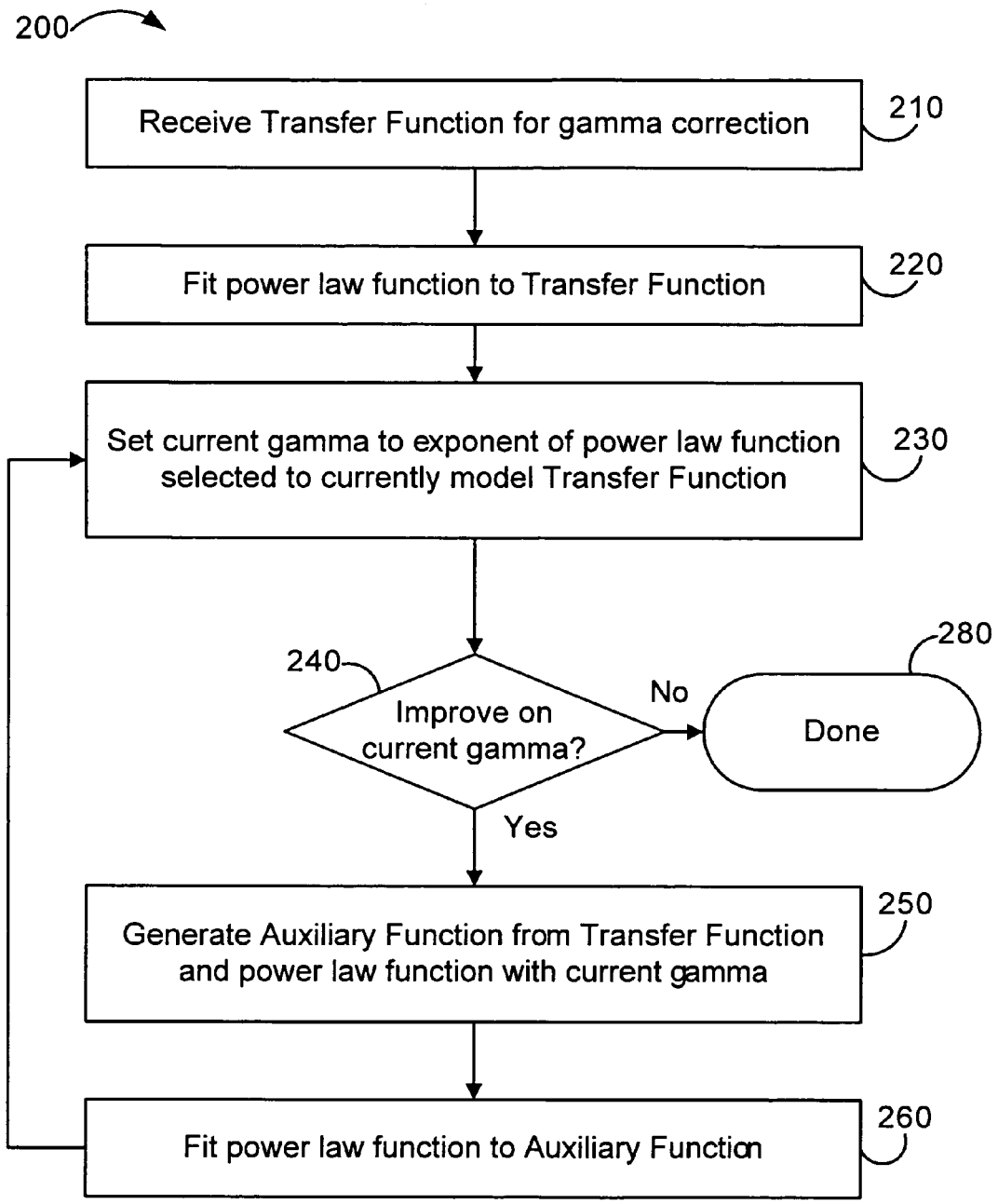
FIGS. 2, 3 and 4B are schematic flow diagrams illustrating methods for gamma correction.

FIG. 2 illustrates a method 200 for modelling a piece-wise continuous transfer function for gamma correction. The method 200 can be performed by a system that includes the data modelling component 124 (FIG. 1B). In addition to modelling opto-electronic transfer functions, the method 200 can be used to model any piece-wise continuous function or monotonically increasing function.

The system receives a transfer function for gamma correction (step 210). As before, the transfer function can be an input transfer function, an output transfer function or a net transfer function that combines the input and output transfer functions. The received transfer function specifies the transfer function values (i.e., output values) for a set of input values, such as color component values of pixels in a digital image. The transfer function can be specified by a look-up table, a mathematical formula or both. For example, the transfer function can be a piece-wise continuous monotonically increasing function, such as the exemplary function illustrated in FIG. 5. Each piece of the piece-wise continuous function can be separately defined by a mathematical formula or a look-up table. The transfer function can be received in a color profile associated with an image, an input device or an output device.

The system fits a power law function to the received transfer function (step 220). The power law function is fit to the transfer function using a data fitting algorithm that optimizes the exponent and other parameters of the power law function. In one implementation, the system uses a linear data fitting algorithm, such as a linear least squares fit, to optimize the parameters of the power law function. In a linear data fitting algorithm, the optimal parameters of the power law function are obtained by solving a set of linear equations. Using the linear data fitting algorithm allows the system to fit the power law function to the transfer function in a computationally efficient way. Alternatively, the system can fit the power law function to the transfer function with a non-linear data fitting algorithm, such as the data fitting algorithm of Levenberg-Marquardt or Graham-Schmidt. Instead of solving linear equations, a non-linear data fitting algorithm finds the optimal parameters of the power law function by solving a system of non-linear equations, for example, by iteration or other known techniques.

In one implementation, the system uses a logarithmic representation of the transfer function rather than the transfer function itself. In this implementation, the system first takes the logarithm of both the transfer function values and the corresponding input values. (This representation is commonly known as a log-log representation.) The logarithms can only be calculated for transfer functions that have positive transfer function values and input values. Transfer functions with non-positive values may be parameterized to have positive values. If no such parameterization is possible, the system can replace or omit the non-positive values (e.g., near the ends of a range of allowed input values). The logarithm can have a base that is larger than one, such as two, e (i.e., 2.718 . . . ) or ten. Next, the system fits a linear function to the logarithmic representation of the transfer function, where the slope $\gamma$ of the linear function corresponds to the exponent of the power law function that models the transfer function in the original, non-logarithmic representation.

The system fits a linear function to the logarithmic representation of the transfer function by performing a linear least square fit. For N transfer function values ($T_i=T(x_i)$, i=1, . . . , N) and corresponding input values ($x_i$, i=1 . . . , N), the least squares fit minimizes the total square error between the logarithm of the transfer function values and the logarithm of the power function that is used to model the transfer function. That is, the least squares fit finds an exponent $\gamma$ (and a constant c for normalization) that minimizes the total square error ("$TSE_L$") in the logarithmic representation, which can be written as $$TSE_L = \Sigma_i (\log(T_i) - \gamma \log(cx_i))^2, \qquad \text{Eq. 1.}$$

A standard way to find the exponent $\gamma$ that minimizes the total square error $TSE_L$ is to solve a set of linear equations that can be derived from Eq. 1. These linear equations can be put in the form of a normal vector equation that has a solution vector ("u") with two components. The first component is the exponent $\gamma$ of the power law function and the second component is the logarithm of the normalization constant (log(c)). The normal vector equation includes a matrix ("A") with dimensions N times 2, its transposed matrix ("$A^T$") with dimensions 2 times N, and a vector ("b") with N components, where N is the number of transfer function data input points that are used to fit the power law function. The normal vector equation can be written as $$A^T A u = A^T b, \qquad \text{Eq. 2.}$$

For the total square error $TSE_L$, the components of the matrix A and the vector b are:

$$A_{i,1} = \log(x_i),$$

$$A_{i,2} = 1, \text{ and}$$

$$b_i = \log(T_i).$$

The solution of the normal equation (Eq. 2) provides an optimal value of the exponent $\gamma$ of the power law function ("G") that fits the transfer function data in the logarithmic representation in the sense that it minimizes the total square error $TSE_L$ in the logarithmic representation. The same power law fit G, however, may give a poor approximation to the transfer function in the original representation, without the logarithms. For example, the total square error ("$TSE_O$") in the original representation is obtained from the difference between the values ($G_i = c x_i^\gamma$) of the power law function G and the transfer function $T_i$ as $$TSE_O = \Sigma_i (T_i - G_i)^2, \qquad \text{Eq. 3.}$$

The system sets a current gamma value to the exponent of the power law function that is currently selected to model the received transfer function (step 230). If the power law function generated in step 220 is the only power law function to model the transfer function, the system sets the current gamma value to the exponent of that power law function. If multiple power law functions have been previously generated to model the received transfer function, the system selects the previous power law function that models the received transfer function with the smallest error, and sets the current gamma value to the exponent of the selected power law function. In one implementation, the modelling error for each of the multiple previously generated power law functions is measured by the total square error according to Eq. 3. Alternatively, the system can use a different measure of the modelling error. For the power law function G that models the received transfer function T, an alternative measure of the modelling error can include one or more terms of the forms $$\Sigma_i |T_i - G_i|^z, \qquad \text{Eq. 4, or}$$

$$\max_i |T_i - G_i|^z, \qquad \text{Eq. 5,}$$

where z is a positive number, such as one or three, and maxi represents the maximum value over all the data points i=1, . . . N.

The system decides whether an improvement is required over the current gamma value (decision 240). This decision or termination condition is based on user input or one or more predetermined criteria, such as a maximum number of trials or a maximum tolerance error. For example, the system can make this decision by comparing a preset threshold with the modelling error of the power law function whose exponent is the current gamma value. The system can use one or more of the error measures described in Eqs. 3, 4 and 5 to make the comparison. In general, different measures of the modelling error can be used to set or select the current gamma value (step 230) and to decide whether an improvement is needed (decision 240). For example, the total square error of Eq. 3 can be used to select the current gamma value, and the maximum difference error of Eq. 5 can be used to decide whether further improvement is needed. In one implementation, the system uses the maximum error measure of Eq. 5 with z set equal to one to decide whether further improvement is needed at step 240. If no improvement is achieved in one or more iterations, the system can terminate the method (step 280). In general, the system will terminate the method after two iterations.

If an improvement is required ("Yes" branch of decision 240), the system generates one or more auxiliary functions from the received transfer function and the power law function whose exponent is the current gamma value (step 250). To generate the auxiliary function, the received transfer function is modified by local differences between the received transfer function and the power law function ("G") whose exponent is the current gamma value. For example, the system can generate auxiliary function values ($F_i = F(x_i)$) for each of N input values ($x_i$, i=1, . . . , N) by adding to the corresponding transfer function values $T_i$ the difference between the transfer function value $T_i$ and the corresponding power law function value $G_i$.

The system can generate the auxiliary function values using a different measure of the local differences between the received transfer function and the power law function G. For example, an auxiliary function value $F_i$ can be generated for each transfer function value $T_i$ based on the distance between the closest points on the received transfer function and the power law function G currently modelling it. The closest points may be at different input values for the power law and transfer functions, e.g., the closest point on the power law function G(x) may be at an input value x that is different from the input value $x_i$ corresponding to the closest point $T_i$ on the transfer function.

To generate the auxiliary function, the system can "reflect" or "mirror" the power law function about the received transfer function. The auxiliary function is a "reflection" of the power law function, if all of the values of the auxiliary function are on a different side of the received transfer function than the values of the previously fit power law function. Accordingly, for each input value $x_i$, if the power law function value $G_i$ is larger than the transfer function value $T_i$ the auxiliary function value $F_i$ is smaller than the transfer function value $T_i$ (or vice versa). In one implementation, the auxiliary function value $F_i$ is selected such that its difference ($F_i-T_i$) from the transfer function value $T_i$ has the same amplitude but opposite sign than the difference ($G_i-T_i$) between the power law function value $G_i$ and the transfer function value $T_i$. That is, $$F_i - T_i = -(G_i - T_i),$$

which gives the auxiliary function the value of $$F_i = 2T_i - G_i.$$

In alternative implementations, the auxiliary function is generated using a modifying parameter that weights the local differences between the received transfer function and the current power law function that models it. The details of how the modifying parameter values are chosen in that implementation are discussed more fully below in reference to FIGS. 3-4B.

Once the auxiliary function values are determined, the system fits a power law function to the auxiliary function (step 260). In one implementation, the power law function is fit to the auxiliary function using the same data fitting algorithm that was used to fit the received transfer function in step 220. In alternative implementations, the system can use a different data fitting algorithm to fit the auxiliary function with a power law function.

In one implementation, the system uses a logarithmic representation and a linear least square algorithm (Eqs. 1 and 2) to fit power law functions to both the auxiliary function and the received transfer function. In this representation, the received transfer function and the auxiliary function can be fit with power law functions using the same matrices A, $A^T$ and therefore the same matrix product ATA of Eq. 2. The only model components that will need to be recalculated to fit the auxiliary function is the vector components $b_i$, which will need to be recalculated as $\log(F_i)$. As before, only positive auxiliary function values are allowed in the logarithmic representation. A zero or negative auxiliary function value $F_i$ can be replaced with a preset value. Alternatively, the system can omit the vector component with a zero or negative auxiliary function value $F_i$, and adjust the left hand side of Eq. 2 accordingly.

Using the power law fits to the auxiliary functions, the system updates the current gamma value (i.e., returns to step 230). The current gamma value is set to the exponent of the power law function that models the received transfer function with the smallest error, e.g., as measured according to any of Eqs. 3-5 or similar such equations. The system fits further power law functions to auxiliary functions until it decides that no more improvement is required to model the received transfer function ("No" branch of decision 240), at which point the method 200 exits, having determined the current gamma value to be the best or a final value for the exponent γ (step 280). The final value for the exponent γ can be used as the exponent of a simple power law function to model the received transfer function for gamma correction.

Figure 3:
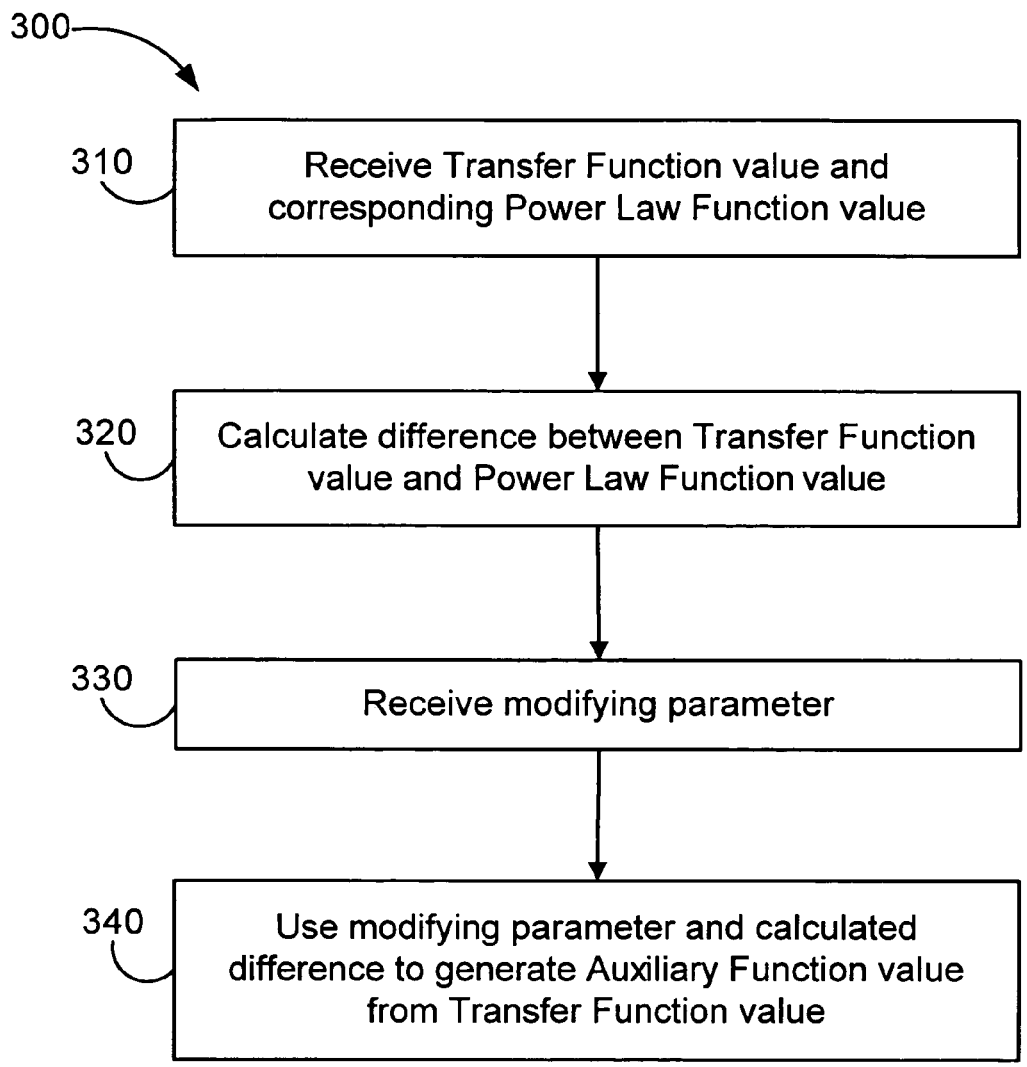

FIG. 3 illustrates a method 300 for generating auxiliary function values based on a piece-wise continuous transfer function and a power law function that models the transfer function. The transfer function specifies a mapping of a graphical attribute, such as a color component. The method 300 illustrates generating an auxiliary function value for a single input value, and can be repeated for multiple input values for generating more values of the auxiliary function. The generated auxiliary function can be fit with a power law function to model the piece-wise continuous transfer function, as discussed more fully above with reference to FIG. 2. The method 300 can be performed in a system that includes the data modelling component 124 (FIG. 1).

A transfer function value and a corresponding value of a power law function are received (step 310). The power law function models the transfer function. In one implementation, the received transfer function value ("$T_i$") and the power law function value ("$G_i$") correspond to the same input value ("$x_i$") that is mapped by the transfer function. Alternatively, the transfer function value $T_i$ and the power law function value $G_i$ can correspond to different input values ($x_i$ and $x_i'$, respectively). For example, the power law fit value $G_i$ can correspond to the power law function's point that is closest to the point representing the transfer function value $T_i$.

A difference is calculated between the transfer function value and the power law function value (step 320). In one implementation, the difference ($D_i$) is calculated by subtracting the power law fit value $G_i$ from the transfer function value $T_i$ at the same input value $x_i$ as $$D_i = T_i - G_i.$$

If the input values $x_i$ and $x_i'$ are different for the transfer function value $T_i$ and the power law fit value $G_i$, respectively, the calculated difference $D_i$ can also include a contribution from a difference between the input values $x_i$ and $x_i'$. For example, the difference can correspond to the Euclidean distance $$D_i = \text{Sqrt}[(T_i - G_i)^2 + (x_i - x_i')^2].$$

A modifying parameter ("M") is received (step 330). The modifying parameter M is a weight that specifies how much of the calculated difference $D_i$ is used to modify the transfer function value $T_i$. In one implementation, the modifying parameter M is about one. Alternatively, an optimal value can be estimated for the modifying parameter M, as discussed more fully below with reference to FIGS. 4A-5.

The modifying parameter M and the calculated difference $D_i$ are used to generate an auxiliary function value ($F_i$) from the transfer function value $T_i$ (step 340). In one implementation, the auxiliary function value $F_i$ is obtained from the transfer function value $T_i$ by modifying $T_i$ in proportion to the product of the modifying parameter M and the calculated difference $D_i$ as $$F_i = T_i + MD_i = T_i + M(T_i - G_i) = (1+M)T_i - G_i.$$

In alternative implementations, the auxiliary function value $F_i$ can be obtained from the transfer function value $T_i$ by modifying $T_i$ with a non-linear function of the calculated difference $D_i$, such as an absolute value $|D_i|$ of the difference $D_i$. In addition, the auxiliary function value $F_i$ can be clipped to be the same as the transfer function value $T_i$ if the difference $D_i$ is negative (or in alternative implementations, positive). The auxiliary function value $F_i$ can also be clipped to avoid negative values. If there is a difference between the input values $x_i$ and $x_i'$ corresponding to the transfer function value $T_i$ and the power law fit value $G_i$, respectively, a new input value $x_i''$ for the generated auxiliary function value can be calculated as $x_i''=x_i+M(x_i-x_i')$.

Figure 4A:
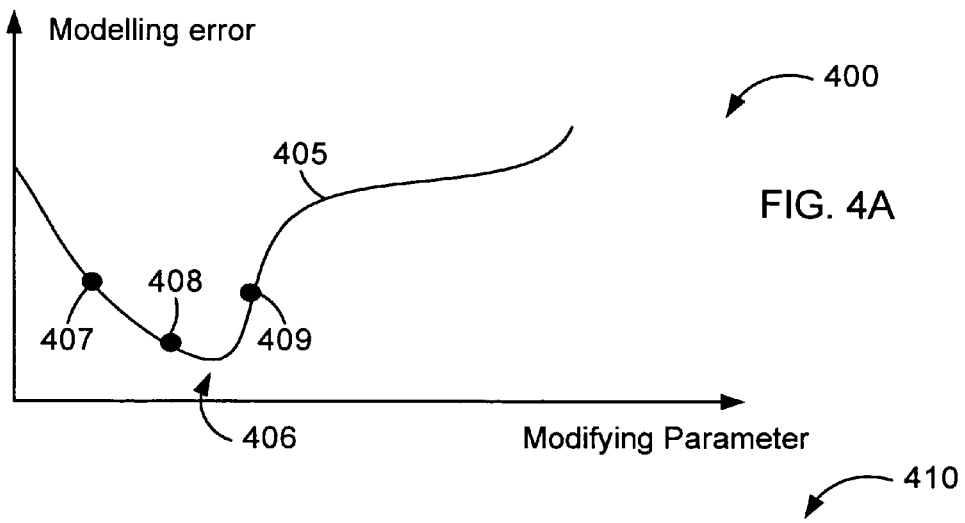
FIG. 4A is a schematic diagram illustrating modelling errors of power law functions fit to different auxiliary functions.
Figure 4B:
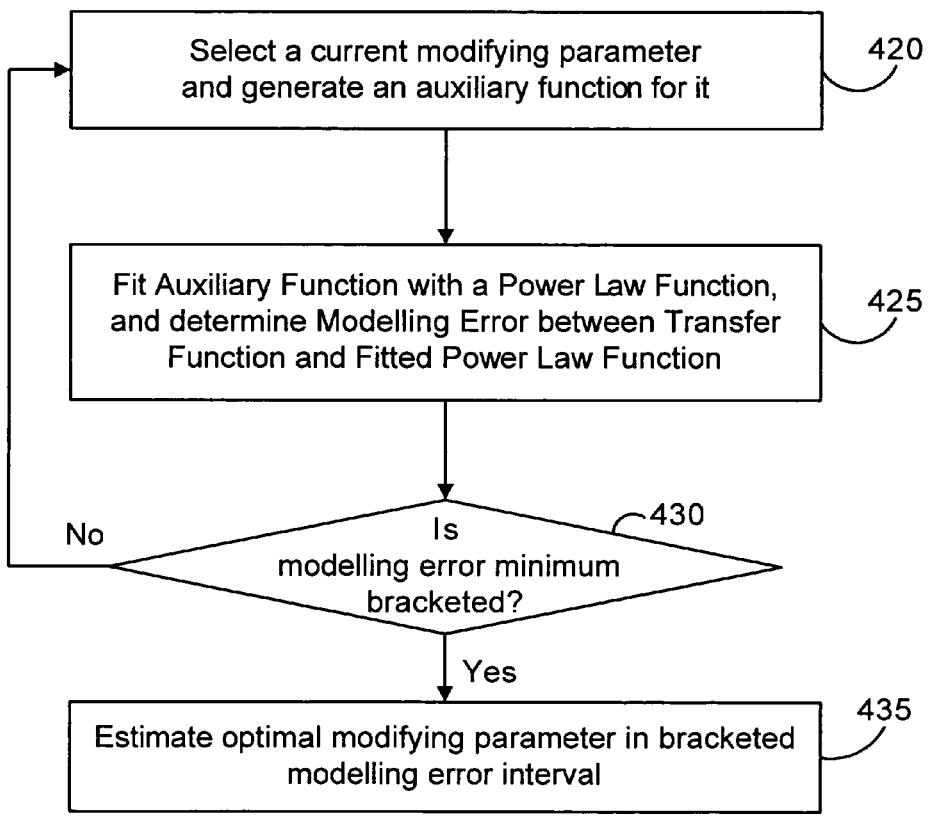

FIGS. 4A and 4B illustrate techniques for estimating an optimal value of a modifying parameter M. As discussed above in reference to FIG. 3, the modifying parameter is used to generate auxiliary functions from a piece-wise continuous transfer function and a power law function that models the transfer function. The power law function has an exponent corresponding to a gamma value for gamma correction. The optimal value of the modifying parameter is used to generate an optimal auxiliary function, which can be fit with a new power law function providing a new current gamma value and current model for the transfer function.

FIG. 4A illustrates a schematic diagram 400 showing a curve 405 that illustrates how the modelling error for an auxiliary function (vertical axis) depends on the value of the modifying parameter (horizontal axis) that is used to generate the auxiliary function. The modelling error measures a total difference between the transfer function and a power law function that is fit to the auxiliary function. The modelling error can be a total square error according to Eq. 3, 4 or 5, or any other measure of the total error between two functions. In one implementation, it is the total square error of Eq. 3. For each modifying parameter shown in curve 405, an auxiliary function was generated from the transfer function and the current power law function according to that modifying parameter. The auxiliary function was then fit with a new power law function, and the modelling error was calculated from the differences between the transfer function and the new power law function.

FIG. 4B illustrates a method 410 that can be used to estimate an optimal value of the modifying parameter. The optimal value is estimated by minimizing the modelling error of power law functions that are fit to auxiliary functions generated from a transfer function and a current power law function. The modelling error is minimized as a function of the modifying parameter used to generate the auxiliary functions. The method 410 can be performed in a system that includes the data modelling component 124 (FIG. 1).

The system selects a current modifying parameter to generate a current auxiliary function from the transfer function and the current power law function that models the transfer function (step 420). The current auxiliary function can be generated as discussed above with reference to FIG. 3. The current modifying parameter can be selected from a predetermined set such as a set of equally spaced positive numbers. For example, the predetermined set can be restricted to positive integers such that a modifying parameter of zero corresponds to an auxiliary function that is substantially identical to the transfer function. The selected modifying parameter can be the smallest integer that has not been previously selected from the predetermined set. That is, the modifying parameter can be selected in numerical order to be one, two, three, etc., up to some finite number. Alternatively, the modifying parameter can be selected in any other order from the predetermined set. Alternatively, the current modifying parameter can be randomly selected as a random value in a predetermined range of values.

The system fits a power law function to the current auxiliary function, and determines the modelling error between the transfer function and the power law function that is fit to the current auxiliary function (step 425). The auxiliary function can be fit with a power law function as discussed above with reference to FIG. 2.

The system determines whether a modifying parameter value corresponding to a minimum modelling error exists, (decision 430). That is, the system determines whether a range of modifying parameters exists, within which a modifying parameter can be found that minimizes the modelling error. In one implementation, the system compares the modelling error obtained for the current value of the modifying parameter with modelling errors that have been obtained previously for other values of the modifying parameter to determine whether a modifying parameter value corresponding to a minimum modelling error has been bracketed between two modifying parameter values.

Typically, the system needs the modelling error for at least three different modifying parameter values to decide whether a modifying parameter corresponding to a minimum modelling error has been bracketed. If the smallest and the largest of the three modifying parameter values have larger modelling errors than the modelling error for the intermediate modifying parameter value, the smallest and the largest of the modifying parameter values define the range within which an optimal modifying parameter value can be found.

For example, the diagram 400 illustrates a first 407, a second 408 and a third 409 data point on the curve 405. The first data point 407 corresponds to a small modifying parameter value, while the third data point 409 corresponds to a large modifying parameter value. The second data point 408 is in between the first and third data points, and has a modelling error that is smaller than the modelling errors specified by the first 407 and third 409 data points. Accordingly, the first 407 and third 409 data points bracket a modifying parameter data point 406 that corresponds to a minimum modelling error.

If the system determines that a modifying parameter having a minimum modelling error has not been bracketed by any of the currently available modifying parameter data points ("No" branch of decision 430), the system selects another current modifying parameter value and generates and fits another auxiliary function using the newly selected current modifying parameter (step 420). The system then redetermines whether a modifying parameter having a minimum modelling error can be bracketed between at least two modifying parameter value data points (decision 430). If a modifying parameter value having a minimum modelling error can be bracketed ("Yes" branch of decision 430), the system uses the information contained in the distribution of modelling errors as a function of modifying parameters to estimate the value of an optimal modifying parameter that will minimize the modelling error (step 435). The estimated optimal modifying parameter value is then used to generate an optimal auxiliary function from the transfer function and the current power law function that is used to model the transfer function, and the optimally generated auxiliary function is fit with a new power law function to model the transfer function.

In one implementation, the optimal modifying parameter is estimated by averaging the two modifying parameters that define the interval that directly brackets the modifying parameter having a minimum modelling error. In another implementation, where the system has calculated at least three modelling error values, the optimal modifying parameter is estimated by fitting a quadratic function to the distribution of modelling error values, and finding the modifying parameter corresponding to the vertex or minimum value of the fitted quadratic function. Alternatively, the system can use a conventional minima searching algorithm, such as a golden search algorithm, to estimate the optimal value of the modifying parameter that will minimize the modelling error within the bracketed interval.

Figure 5:
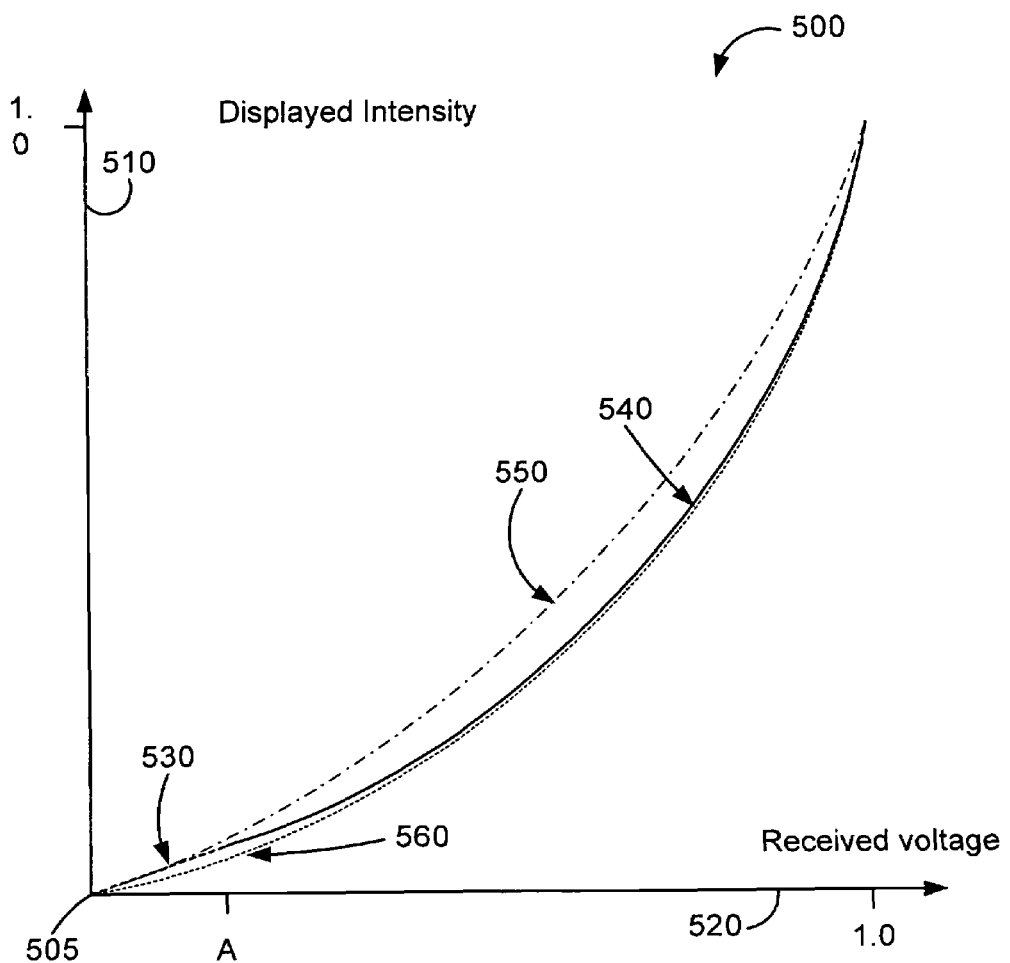
FIG. 5 is schematic diagram illustrating an exemplary transfer function for gamma correction.

FIG. 5 schematically illustrates an exemplary opto-electronic transfer function, such as an output transfer function for a CRT monitor using phosphors. The transfer function can describe a displayed optical intensity for red, green or blue pixels as a function of the corresponding voltage received by the monitor. The received voltage is in accordance with the red, green or blue components of a device specific electronic representation of a given color. For example, the transfer function can correspond to a standard default color space ("sRGB") profile or a high definition television ("HDTV") profile.

The transfer function is illustrated in a reference system 500 having an origin 505, a vertical axis 510 and a horizontal axis 520. The color intensity and the received voltage are illustrated on the vertical 510 and the horizontal 520 axis, respectively, and normalized to take values between zero and 1.0. Accordingly, minimum values are represented by the origin 505 and maximum values are represented by marks labeled 1.0. Alternatively, the color intensity and the voltage can be differently normalized. For example, the received voltage can have 256 discrete values (also called net points) and the horizontal axis 520 can be labeled by integers between 0 and 255 representing voltage values in increasing order. In alternative implementations, the transfer function can be any piece-wise continuous transfer function used for gamma correction or other purposes.

The transfer function is a piece-wise continuous monotonically increasing function of the voltage ("V") and includes a substantially linear piece 530 for voltages between the minimum voltage (represented by the origin) and a voltage value A, and a substantially non-linear piece 540 for voltages above the voltage value A. For example, the non-linear piece 540 can be proportional to a shifted power law function specified by a positive exponent ("$\alpha$") and two constants ("a" and "b") as $(V+a)^\alpha + b$.

The non-linear piece 540 can be normalized with a multiplicative factor such that, for a voltage value of one, the corresponding transfer function value is also one.

For given values of a, b, and a of the non-linear piece 540, the linear piece 530 can be constructed as the line connecting the origin 505 and the non-linear piece 530 at the voltage value A. For the sRGB profile, a is about 0.055, b is about zero, $\alpha$ is about 2.4, and A is about 0.039. For the HDTV profile, a is about 0.099, b is about zero, $\alpha$ is about 2.2, and A is about 0.018.

FIG. 5 also illustrates a first power law function 550 and an optimal power law function 560 to model the transfer function specified by the pieces 530 and 540. Both of the power law functions 550 and 560 are generated by the same linear algorithm for data fitting, such as the linear least square fit using logarithmic representation discussed above in reference to FIG. 2. The first power law function 550 is generated by applying the linear data fitting algorithm directly to the transfer function including both the linear 530 and the non-linear 540 pieces. For the sRGB profile, the exponent of the first power law function 550 is about 1.756, and the corresponding modelling error is measured by a total square error of about 0.938. For the HDTV profile, the exponent of the first power law function 550 is about 1.423, and the corresponding total square error is about 1.594.

The optimal power law function 560 is generated by applying the linear data fitting algorithm to an auxiliary function generated from the transfer function using a modifying parameter as discussed above with reference to FIG. 3. An optimal value ("M0") of the modifying parameter can be estimated as discussed above with reference to FIGS. 4A and 4B. For the sRGB profile, the modifying parameter has an optimal value M0 of about 1.326, the exponent of the optimal power law fit is about 2.237, and the corresponding modelling error is measured by a total square error of about 0.003. Thus, by changing the modifying parameter from zero to its optimal value, the modelling error is decreased from about 0.938 to about 0.003. For the HDTV profile, the exponent of the optimal power law fit is about 1.929, and the corresponding total square error is about 0.014. Thus, by changing the modifying parameter from zero to its optimal value, the modelling error is decreased from about 1.594 to about 0.014. In sum, the modelling error has been substantially decreased both for the sRGB and HDTV profiles by fitting a power law function to an auxiliary function generated from the transfer function rather than fitting the transfer function itself.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A computer-implemented method comprising:
   receiving an image having color information;
   receiving a transfer function, wherein the transfer function specifies a set of output values corresponding to a set of input values;
   iteratively, until a termination flag is set:
      receiving a first power law function;
      generating an auxiliary function including modifying the transfer function using local differences between the transfer function and the first power law function;
      defining a second power law function by fitting a power law function to the auxiliary function;
      calculating a modelling error between the second power law function and the transfer function, wherein the modelling error is an error value obtained from local differences between the second power law function and the transfer function;
      providing the second power law function as the first power law function for the next iteration when the modelling error is greater than or equal to a predetermined value; and
      setting the termination flag when the modelling error is less than the predetermined value;
   using the second power law function to calculate a gamma value that is used to adjust the color information of the image; and
   rendering, using a computer, the image using the adjusted color information,
   where in a first iteration, the first power law function is defined by fitting a power law function to the transfer function.

2. The method of claim 1, where modifying the transfer function using local differences includes determining a difference for one or more input values between the transfer function and the first power law function.

3. The method of claim 1, where modifying the transfer function using local differences includes determining one or more closest points between the transfer function and the first power law function without regard for the input value associated with the respective points.

4. The method of claim 1, further comprising:
   counting the number of iterations; and
   setting the termination flag when the number of iterations exceeds a maximum number of iterations.

5. The method of claim 1, wherein:
   the transfer function is a transfer function for gamma correction, and the first and second power law functions are power law functions having a form of $cx^\beta$, wherein x is the input variable of the power law functions, and c and $\beta$ are real numbers.

6. The method of claim 5, wherein:
   fitting the second power law function to the auxiliary function includes fitting a linear function to a logarithmic representation of the auxiliary function.

7. The method of claim 6, wherein:
   fitting the linear function to the logarithmic representation of the auxiliary function includes minimizing a least square error between the linear function and the logarithmic representation of the auxiliary function.

8. The method of claim 1, further comprising:
   using a modifying parameter to weight the local differences between the transfer function and the first power law function, and using the weighted local differences to generate the auxiliary function from the transfer function.

9. The method of claim 8, further comprising:
   generating a plurality of second auxiliary functions from the transfer function, the first power law function and a corresponding plurality of modifying parameters, wherein each auxiliary function is generated by weighting the local differences between the transfer function and the first power law function using a corresponding one of the plurality of modifying parameters;
   fitting each of the plurality of second auxiliary functions to generate a respective plurality of second power law functions, where each of the plurality of second power law functions corresponds to one of the plurality of modifying parameters;
   calculating a plurality of modelling errors between the transfer function and each of the plurality of second power law functions, wherein each of the modeling errors corresponds to one of the plurality of modifying parameters;
   executing a minimization procedure to determine a value of a particular modifying parameter of the plurality of modifying parameters that minimizes the modelling error,
   using the value of the particular modifying parameter that minimizes the modelling error to weight the local differences between the transfer function and the first power law function; and
   generating the auxiliary function using the particular modifying parameter, the transfer function, and the first power law function.

10. The method of claim 9, wherein executing the minimization procedure comprises fitting a quadratic function to a distribution of modelling errors as a function of the plurality of modifying parameters.

11. The method of claim 9, wherein executing the minimization procedure comprises executing a golden search algorithm.

12. The method of claim 1, wherein: calculating the modelling error for the second power law function comprises calculating a total square error between the transfer function and the second power law function.

13. The method of claim 1, wherein: calculating the modelling error for the second power law function comprises calculating the maximum absolute difference between the transfer function and the second power law function.

14. The method of claim 1, wherein: receiving a transfer function comprises receiving a plurality of transfer function values.

15. The method of claim 1, wherein: receiving a transfer function comprises receiving a piecewise continuous monotonically increasing function.

16. A computer-implemented method comprising:
receiving an image having color information;
receiving a transfer function, wherein the transfer function specifies a set of output values corresponding to a set of input values;
fitting the transfer function with a first power law function;
iteratively, until a termination flag is set:
    reflecting the first power law function about the transfer function to generate an auxiliary function;
    defining a second power law function by fitting a power law function to the auxiliary function;
    calculating a modelling error between the second power law function and the transfer function, wherein the modelling error is an error value obtained from local differences between the second power law function and the transfer function;
    identifying the first power law function with the second power law function for a next iteration when the modelling error is greater than or equal to a predetermined value; and
    setting the termination flag when the modelling error is less than the predetermined value;
using the second power law function to calculate a gamma value that is used to adjust the color information of the image; and
rendering, using a computer, the image using the adjusted color information.

17. A computer program product, implemented on a machine readable storage device, the computer program product comprising instructions operable to cause a programmable processor to:
receive an image having color information;
receive a transfer function, wherein the transfer function specifies a set of output values corresponding to a set of input values;
iteratively, until a termination flag is set:
    receive a first power law function;
    generate an auxiliary function including modifying the transfer function using local differences between the transfer function and the first power law function;
    define a second power law function by fitting a power law function to the auxiliary function;
    calculate a modelling error between the second power law function and the transfer function, wherein the modelling error is an error value obtained from local differences between the second power law function and the transfer function;
    provide the second power law function as the first power law function for the next iteration when the modelling error is greater than or equal to a predetermined value; and
    set the termination flag when the modelling error is less than the predetermined value; and
use the second power law function to calculate a gamma value that is used to adjust the color information of the image; and
render the image using the adjusted color information,
where in a first iteration, the first power law function is defined by fitting a power law function to the transfer function.

18. The computer program product of claim 17, where modifying the transfer function using local differences includes determining a difference for one or more input values between the transfer function and the first power law function.

19. The computer program product of claim 17, where modifying the transfer function using local differences includes determining one or more closest points between the transfer function and the first power law function without regard for the input value associated with the respective points.

20. The computer program product of claim 17, further comprising instructions operable to cause the programmable processor to count the number of iterations; and to
set the termination flag when the number of iterations exceeds a maximum number of iterations.

21. The computer program product of claim 17, wherein:
the transfer function is a transfer function for gamma correction, and the first and second power law functions are power law functions having a form of $cx^\beta$, wherein x is the input variable of the power law functions, and c and $\beta$ are real numbers.

22. The computer program product of claim 21, wherein the instructions to fit the second power law function to the auxiliary function includes instructions to fit a linear function to a logarithmic representation of the auxiliary function.

23. The computer program product of claim 22, wherein the instructions to fit the linear function to the logarithmic representation of the auxiliary function includes instructions to minimize a least square error between the linear function and the logarithmic representation of the auxiliary function.

24. The computer program product of claim 17, further comprising instructions operable to cause the programmable processor to use a modifying parameter to weight the local differences between the transfer function and the first power law functions and to use the weighted local differences to generate the auxiliary function from the transfer function.

25. The computer program product of claim 24, further comprising instructions to:
generate a plurality of second auxiliary functions from the transfer function, the first power law function and a corresponding plurality of modifying parameters, wherein each auxiliary function is generated by weighting the local differences between the transfer function and the first power law function using a corresponding one of the plurality of modifying parameters;
fit each of the plurality of second auxiliary functions to generate a respective plurality of second power law functions, where each of the plurality of second power law functions corresponds to one of the plurality of modifying parameters;
calculate a plurality of modelling errors between the transfer function and each of the plurality of second power law functions, wherein each of the modelling errors corresponds to one of the plurality of modifying parameters;

execute a minimization procedure to determine a value of a particular modifying parameter of the plurality of modifying parameters that minimizes the modelling error; and use the value of the particular modifying parameter that minimizes the modelling error to weight the local differences between the transfer function and the first power law function; and generate the auxiliary function using the particular modifying parameter, the transfer function, and the first power law function.

26. The computer program product of claim 25, wherein the instructions to execute the minimization procedure comprise instructions to fit a quadratic function to a distribution of modelling errors as a function of the plurality of modifying parameters.

27. The computer program product of claim 25, wherein the instructions to execute the minimization procedure comprise instructions to execute a golden search algorithm.

28. The computer program product of claim 17, wherein the instructions to calculate the modelling error for the second power law function comprises instructions to calculate a total square error between the transfer function and the second power law function.

29. The computer program product of claim 17, wherein the instructions to calculate the modelling error for the second power law function comprises instructions to calculate the maximum absolute difference between the transfer function and the second power law function.

30. The computer program product of claim 17, wherein the received transfer function comprises a plurality of transfer function values.

31. The computer program product of claim 17, wherein the received transfer function comprises a piecewise continuous monotonically increasing function.

32. A computer program product, implemented on a machine readable storage device, the computer program product comprising instructions operable to cause a programmable processor to:

receive an image having color information;

receive a transfer function, wherein the transfer function specifies a set of output values corresponding to a set of input values;

fit the transfer function with a first power law function; and to iteratively, until a termination flag is set:
reflect the first power law function about the transfer function to generate an auxiliary function;
define a second power law function by fitting a power law function to the auxiliary function;
calculate a modelling error between the second power law function and the transfer function, wherein the modelling error is an error value obtained from local differences between the second power law function and the transfer function;
identify the first power law function with the second power law function for a next iteration when the modelling error is greater than or equal to a predetermined value; and
set the termination flag when the modelling error is less than the predetermined value;

use the second power law function to calculate a gamma value that is used to adjust the color information of the image; and render the image using the adjusted color information.

33. A system comprising:
one or more computers configured to perform operations including:
receiving an image having color information;
receiving a transfer function, wherein the transfer function specifies a set of output values corresponding to a set of input values;
iteratively, until a termination flag is set:
receiving a first power law function;
generating an auxiliary function including modifying the transfer function using local differences between the transfer function and the first power law function;
defining a second power law function by fitting a power law function to the auxiliary function;
calculating a modelling error between the second power law function and the transfer function, wherein the modelling error is an error value obtained from local differences between the second power law function and the transfer function;
providing the second power law function as the first power law function for the next iteration when the modelling error is greater than or equal to a predetermined value; and
setting the termination flag when the modelling error is less than the predetermined value;
using the second power law function to calculate a gamma value that is used to adjust the color information of the image; and
rendering the image using the adjusted color information, where in a first iteration, the first power law function is defined by fitting a power law function to the transfer function.

34. The system of claim 33, where modifying the transfer function using local differences includes determining a difference for one or more input values between the transfer function and the first power law function.

35. The system of claim 33, where modifying the transfer function using local differences includes determining one or more closest points between the transfer function and the first power law function without regard for the input value associated with the respective points.

36. The system of claim 33, further configured to perform operations comprising:
counting the number of iterations; and
setting the termination flag when the number of iterations exceeds a maximum number of iterations.

37. The system of claim 33, wherein:
the transfer function is a transfer function for gamma correction, and the first and second power law functions are power law functions having a form of $cx^\beta$, wherein x is the input variable of the power law functions, and c and $\beta$ are real numbers.

38. The system of claim 37, wherein:
fitting the second power law function to the auxiliary function includes fitting a linear function to a logarithmic representation of the auxiliary function.

39. The system of claim 38, wherein:
fitting the linear function to the logarithmic representation of the auxiliary function includes minimizing a least square error between the linear function and the logarithmic representation of the auxiliary function.

40. The system of claim 1, further configured to perform operations comprising:
using a modifying parameter to weight the local differences between the transfer function and the first power law function, and using the weighted local differences to generate the auxiliary function from the transfer function.

41. The system of claim 40, further configured to perform operations comprising:

generating a plurality of second auxiliary functions from the transfer function, the first power law function and a corresponding plurality of modifying parameters, wherein each auxiliary function is generated by weighting the local differences between the transfer function and the first power law function using a corresponding one of the plurality of modifying parameters;

fitting each of the plurality of second auxiliary functions to generate a respective plurality of second power law functions, where each of the plurality of second power law functions corresponds to one of the plurality of modifying parameters;

calculating a plurality of modelling errors between the transfer function and each of the plurality of second power law functions, wherein each of the modeling errors corresponds to one of the plurality of modifying parameters;

executing a minimization procedure to determine a value of a particular modifying parameter of the plurality of modifying parameters that minimizes the modelling error, using the value of the particular modifying parameter that minimizes the modelling error to weight the local differences between the transfer function and the first power law function; and generating the auxiliary function using the particular modifying parameter, the transfer function, and the first power law function.

42. The system of claim 41, wherein executing the minimization procedure comprises fitting a quadratic function to a distribution of modelling errors as a function of the plurality of modifying parameters.

43. The system of claim 41, wherein executing the minimization procedure comprises executing a golden search algorithm.

44. The system of claim 33, wherein: calculating the modelling error for the second power law function comprises calculating a total square error between the transfer function and the second power law function.

45. The system of claim 33, wherein: calculating the modelling error for the second power law function comprises calculating the maximum absolute difference between the transfer function and the second power law function.

46. The system of claim 33, wherein: receiving a transfer function comprises receiving a plurality of transfer function values.

47. The system of claim 33, wherein: receiving a transfer function comprises receiving a piecewise continuous monotonically increasing function.

* * * * *

UNITED STATES PATENT AND TRADEMARK OFFICE
CERTIFICATE OF CORRECTION

PATENT NO.         : 7,574,335 B1                                         Page 1 of 1
APPLICATION NO. : 10/777566
DATED              : August 11, 2009
INVENTOR(S)        : Estrada It is certified that error appears in the above-identified patent and that said Letters Patent is hereby corrected as shown below:

Claim 20:
    column 18, lines 25-29:
        delete
            "20. The computer program product of claim 17, further comprising instructions operable to cause the programmable processor to count the number of iterations; and to set the termination flag when the number of iterations exceeds a maximum number of iterations.", and replace with
            --20. The computer program product of claim 17, further comprising instructions operable to cause the programmable processor:
                to count the number of iterations; and
                to set the termination flag when the number of iterations exceeds a maximum number of iterations.--

Claim 24:
    column 18, line 49:
        delete "functions", and replace with --function,--

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,574,335 B1 | Page 1 of 1 |
| APPLICATION NO. | : 10/777566 | |
| DATED | : August 11, 2009 | |
| INVENTOR(S) | : Estrada | |

It is certified that error appears in the above-identified patent and that said Letters Patent is hereby corrected as shown below:

On the Title page,

[*] Notice:     Subject to any disclaimer, the term of this patent is extended or adjusted under 35 U.S.C. 154(b) by 698 days.

Delete the phrase "by 698 days" and insert -- by 1111 days --

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,574,335 B1  Page 1 of 1
APPLICATION NO. : 10/777566
DATED : August 11, 2009
INVENTOR(S) : James J. Estrada It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1524 days.

Signed and Sealed this

Seventh Day of September, 2010

David J. Kappos
*Director of the United States Patent and Trademark Office*